United States Patent
Hsieh et al.

(10) Patent No.: US 8,107,050 B2
(45) Date of Patent: Jan. 31, 2012

(54) BISTABLE DISPLAY MATERIALS AND METHODS AND DEVICES THEREOF

(75) Inventors: Pao-Ju Hsieh, Hsinchu (TW);
Hui-Lung Kuo, Taipei (TW)

(73) Assignee: Industrial Technology Research Institute (TW)

( * ) Notice: Subject to any disclaimer, the term of this patent is extended or adjusted under 35 U.S.C. 154(b) by 312 days.

(21) Appl. No.: 12/562,391

(22) Filed: Sep. 18, 2009

(65) Prior Publication Data
US 2010/0321626 A1 Dec. 23, 2010

(30) Foreign Application Priority Data

Jun. 19, 2009 (TW) ............................... 98120582 A

(51) Int. Cl.
*C09K 19/02* (2006.01)
*C09K 19/34* (2006.01)
(52) U.S. Cl. ...................................................... 349/182
(58) Field of Classification Search .................. 349/182; 252/299.01
See application file for complete search history.

(56) References Cited

U.S. PATENT DOCUMENTS

| 5,409,744 | A | * | 4/1995 | Gotoh et al. ................. 428/1.53 |
| 5,729,320 | A | | 3/1998 | Eidenschink et al. |
| 2010/0085510 | A1 | * | 4/2010 | Okuyama et al. ............... 349/65 |

* cited by examiner

*Primary Examiner* — Eric Wong
(74) *Attorney, Agent, or Firm* — Lowe Hauptman Ham & Berner, LLP

(57) ABSTRACT

A display material and method and device thereof are provided. The display material is first formed by evenly mixing appropriate weight ratios of DFLCs, incurable nanoparticles, curable nanoparticles, and a photoinitiator. Next, the evenly mixed mixture is disposed between two parallel conducting transparent substrates, wherein an electrical field is conducted thereto and the DFLCs therein aligned to the direction of the applied electrical field. Concurrently, under the applied electrical field, some curable nanoparticles within the evenly mixed mixture, form short nano chains, initiating the photo initiator. The frame structure of short nano chains stabilize both the clear and scattering states, thereby the bistable characteristic was improved and the contrast ratio was enhanced as applied to bistable displays.

9 Claims, 2 Drawing Sheets

BISTABLE DISPLAY MATERIALS AND METHODS AND DEVICES THEREOF

CROSS REFERENCE TO RELATED APPLICATIONS

This Application claims priority of Taiwan Patent Application No. 098120582, filed on Jun. 19, 2009, the entirety of which is incorporated by reference herein.

BACKGROUND OF THE INVENTION

1. Field of the Invention

The present invention relates to bistable display devices, and in particular relates to the materials thereof and methods for manufacturing the devices and the materials.

2. Description of the Related Art

Polymer dispersed liquid crystal (PDLC), having several well-known advantages such as polarizer-free, large-area coatable, and less precision requirement on cell gap, is very suitable for flexible display application. However, due to needing a continuous electrical field to retain display image, PDLC is hard to apply as an energy-saving device. Moreover, PDLC hardly offer high display quality, such as contrast ratio, since the difficulty to perfectly match the refractive index between the polymer and the liquid crystal.

Recently a filled nematic liquid crystal display device has been disclosed by mixing some low portion of highly dispersed inorganic nanoparticles, like aerosils, into the liquid crystal molecules phase. It is realized aerosils tend to form larger agglomerates via hydrogen bonding, so there are lots pseudo-bridge linkage between silicon nanoparticles. In initial off-state, the system has a milky appearance because of scattering polydomain formation due to their large optical anisotropy; while in the on state the liquid crystal molecules rotated homeotropically and switched to a transparent state under electrical field, the scattering is low due to the small size of the dispersed particles. Since the bonding between aerosils were reoriented and reformed as a homeotropic frame by following the rotation of liquid crystal molecules, the transparent is retained after removing electrical field, a bistable display was obtained consequently. Therefore filled nematic display is a good candidate to apply in some energy-saving display, like e-Books.

In U.S. Pat. No. 5,729,320, a filled liquid crystal display material and a corresponding device are disclosed, wherein the small quantity of aerosils are well mixed in the liquid crystal molecules, and the memory effect via the aerosils frame structure reached to of 90%.

However, it is true that the operation for switching to the clear state is more easy and stable than back to scattering state. The homeotropic frame structure is firm so that the memory effect in clear state can till quite a long time. In the embodiments of U.S. Pat. No. 5,729,320, heat, laser, ultrasonic wave, or exterior stress are some obvious but indeed impracticable means to break the hydrogen bonding, it is preferable to switch by the electrical field.

Dual frequency liquid crystal (DFLC) is known to use to improve response time of TN LCD. It is notable to be able to change dielectric anisotropic characteristics in different frequency fields. Usually DFLCs show positive dielectric anisotropy under lower frequency, and turn to negative dielectric anisotropy under higher frequency, therein critical frequency called crossover frequency existed as the dielectric anisotropy is zero. There are lots of other commercial dual frequency liquid crystal materials such as DF-02xx, DF-05xx, FX-1001, and FX-1002 from Chisso, MLC-2048 from Merck, for example, the crossover frequency of MLC-2048 is about 13 kHz. Since DFLCs can be driven by electric field in both on and off state, it is found in Electronics Letters 1991, Vol. 27, 13, 1195, a dual frequency liquid crystal molecule is replaced in filled nematic as a method of two-frequency addressing scheme.

However, the absolute value of dielectric anisotropies of the DFLCs are relatively low, especially the negative dielectric anisotropy. That means the threshold voltage will be increased and the scattering dispersed state is hard to completely reformed, as a result, the memory effect and the contrast of the display are badly influenced.

It is benefit to use DFLCs in Filled nematic due to their easy driving scheme, Nevertheless, the contrast is also important for future display application.

BRIEF SUMMARY OF THE INVENTION

The invention provides a method for adopting a bistable display medium, comprising evenly mixing DFLCs, incurable nanoparticles, curable nanoparticles, and a photo initiator to form a mixture; applying an low frequency field to the mixture, wherein the voltage is large enough to let DFLCs vertically stand; and exposing with UV light. The curable nanoparticles are cured to form some nano chains, wherein the curable nanoparticles and the incurable nanoparticles have a weight ratio of about 10/90 to 60/40, the DFLCs and the combination of the total nanoparticles have a weight ratio of about 98/2 to 93/7; and the curable nanoparticles and the photo initiator have a weight ratio of about 99.5/0.5 to 95/5.

The invention also provides a bistable display material, comprising 98 to 93 parts by weight of DFLCs, and 2 to 7 parts by weight of nano composition, wherein the nano composition is composed of 10 to 60 parts by weight of a nano chain and 90 to 40 parts by weight of incurable nanoparticles.

The invention further provides a bistable display device, comprising a liquid crystal layer disposed between two substrates; wherein the liquid crystal layer comprises the bistable display material as described above.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
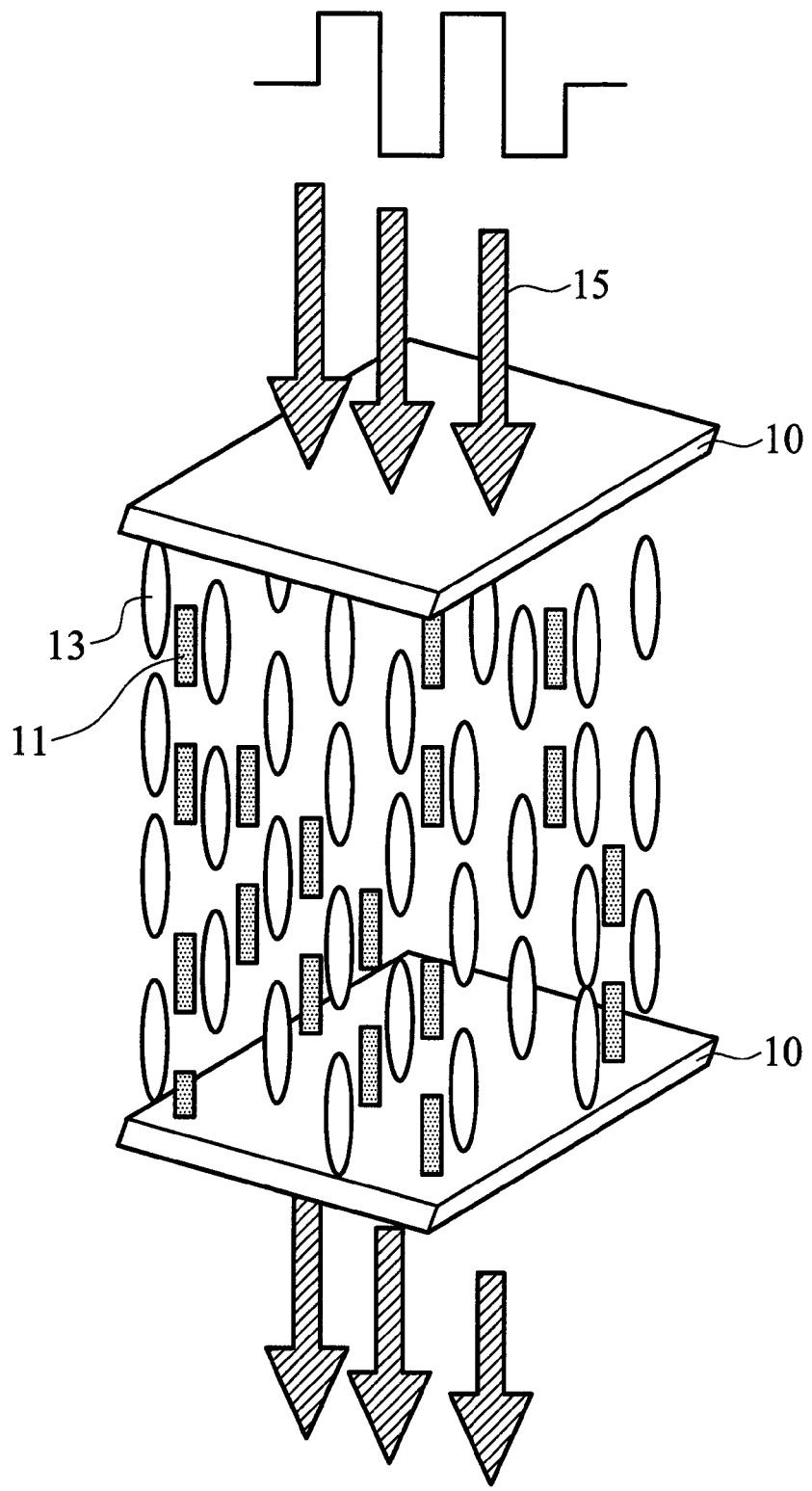
FIG. 1 is schematic view showing the bistable display device in a clear state in the invention.

The following description is of the best-contemplated mode of carrying out the invention. This description is made for the purpose of illustrating the general principles of the invention and should not be taken in a limiting sense. The scope of the invention is best determined by reference to the appended claims.

The nano chains are introduced to the DFLC medium to form poly-domain regions, such that the problem of low contrast between clear and scattering states due to insufficient scattering of the scattering state is solved. The nano chains are cured of curable nanoparticles, being evenly mixed in DFLCs, by photo-radiation.

First, DFLCs, incurable nanoparticles, curable nanoparticles, and a photo initiator are evenly mixed.

The DFLCs and the combination of the curable and incurable nanoparticles have a weight ratio of about 98/2 to 93/7. If the ratio of the combination of the nanoparticles is too high or too low, it will be unfavorable for the bistable states. The DFLCs can adopt MLC-2048 commercially available from Merck, DF-02xx, DF-05xx, FX-1001, or FX-1002 commercially available from Chisso, or use lab-made formulation.

The incurable nanoparticles have a diameter of 5 nm to 50 nm, and include titanium oxide, silicon oxide, aluminum oxide, iron oxide, or combinations thereof. The incurable nanoparticles include AEROSIL®300 or R812 commercially available form Degussa, HDK®N20, T40, or H15 commercially available from Wacker, or CAB-O-SIL series commercially available from Cabot. In addition, incurable nanoparticles can be hydrophilic or hydrophobic.

The curable nanoparticles have a diameter of 5 nm to 50 nm, wherein the core thereof includes titanium oxide, silicon oxide, aluminum oxide, iron oxide, or combinations thereof, and the surface thereof has an organic segment having a carbon-carbon double bond from modification. The carbon-carbon double bonds on the nanoparticles surface can be further cured by the photo initiator to form nano chains. The described curable nanoparticles include AEROSIL® R711 or R7200 commercially available from Degussa. Similarly, the nanoparticles may be hydrophilic or hydrophobic. In the combination of the nanoparticles, the curable nanoparticles and incurable nanoparticles have a weight ratio of about 10:90 to 60:40. If the ratio of the curable nanoparticles is too high, the system tends to monostable state (only clear state) and it would be difficult to form a scattering state. If the ratio of the curable nanoparticles is too low, its effect would be similar to U.S. Pat. No. 5,729,320 and therefore the system would have low contrast.

The photo initiator determines the exposure factors such as radiation type, radiation wavelength, and radiation intensity. The photo initiator includes acetophenones such as 2-methyl-1-(4-(methylthio)phenyl)-2-morpholino-propane), 1-hydroxycyclohexyl phenyl ketone, diethoxyacetophenone, 2-hydroxy-2-methyl-1-phenyl-propane-1-one, 2-benzyl-2-(dimethylamino)-1-[4-(morpholinyl)phenyl]-1-butanone, or other suitable acetophenones. The photo initiator also includes benzoins such as benzoin, benzoin methyl ether, benzyl dimethyl ketal, or other suitable benzoins. The photo initiator further includes benzophenones such as benzophenone, 4-phenyl benzophenone, hydroxylbenzohenone, or other suitable benzophenones. The photo initiator also includes thioxanthones such as isopropyl thioxanthone, 2-chlorothioxanthone, or other suitable thioxanthones. The photo initiator also includes anthraquinones such as 2-ethylanthraquinone, or the likes. The described radical photo initiator can be used individually, or collectively to obtain higher photosensitivity. For example, the photo initiator combination can be isopropyl thioxanthone mixed with 2-benzyl-2-(dimethyl amino)-1-[4-(morpholinyl)phenyl]-1-butanone. Note that the ratio between the photo initiator and the curable nanoparticles will determine the length of the nano chains. The curable nanoparticles and the photo initiator have a weight ratio of 99.5/0.5 to 95/5. If the weight ratio of the photo initiator is too high, the length of the nano chains will be too short to assist the frame structure. It is similar to the condition without adding the curable nanoparticles, and the contrast of the system cannot be enhanced. On the other hand, if the weight ratio of the photo initiator is too low, the nano chains length will be too long. The system with the too long nano chains only has a single stable clear state.

The mixtures were filled in two transparent substrates without any alignment treatment, and then applied an electrical field. The substrate can be chosen as hard plate as glass, quartz, or the likes, or flexible plate such as plastic, rubber, polyester, polycarbonate, or the likes. In one embodiment, the electrical field is a low frequency field of 10 Hz to 500 Hz, and the DFLCs in the mixture will rotate homeotropically to follow the applied electrical field. Meanwhile, the hydrogen bonding on the agglomerates of the curable and incurable nanoparticles are broken due to the DFLCs' rotating, and quickly new hydrogen bond will link as pseudo-bridge frame structure corresponding to the direction of the rotated liquid crystal molecules. A clear appearance will be observed.

Next, the system is exposed under electric field, the curable nanoparticles in the frame are cured to form some short nano chains. In one embodiment, the exposed light has a wavelength of about 320 nm to 350 nm and an exposure period of 20 seconds to 1 minute. In the present invention the nano chains are a critical and distinguishable portion. In conventional arts, the incurable nanoparticles in the frame structure are bridged to each other by hydrogen bonding. Applying a high frequency electrical field may break the hydrogen bonding between the incurable nanoparticles, wherein the incurable nanoparticles rotate to be parallel with the electrical field direction, and the incurable nanoparticles are re-bridged by hydrogen bonding therebetween. In the invention, the incurable and the curable nanoparticles are simultaneously adopted, and the nanoparticles in the frame structure before exposed a light are bridged by hydrogen bonding. The system is applied a high frequency electrical field to be a totally clear state, and is simultaneously exposed a light. As such, the curable nanoparticles are cured to form dislocated nano chains in parallel with the electrical field direction. The non-continuous nano chains may assist the frame structure, and the nano chains are not easily broken by the liquid crystal molecules rotation during electrical field conversion. Alternatively, the non-continuous nano chains restrain the liquid crystal molecules rotation during the electrical field conversion. The nano chains provide sufficient anchoring energy to the liquid crystal molecules under the high frequency electrical field, such that the DFLCs will form more polydomain regions due to competition between the high frequency electrical field and the nano chains in parallel with the electrical field direction. Accordingly, the scattering degree of the system is largely enhanced, thereby improving the contrast ratio thereof. When the liquid crystal system is converted back to the clear state by applying a low frequency electrical field, the non-continuous nano chains accelerate to bridge the frame structure and therefore efficiently enhance the response speed. Accordingly, the non-continuous nano chains of the invention may serve as assist frame. Furthermore, the dislocated nano chains also enforce the scattering degree of the system, such that the contrast between the clear and the scattering states is improved. FIG. 1 shows the bistable display device of the invention in a clear state. As shown in FIG. 1, the nano chains 11 and the DFLCs 13 of the bistable display material disposed between two substrates 10 are aligned in parallel with the low frequency electrical field direction 15. The nano chains are cured by curable nanop articles (not shown) under the electrical field by exposing a light. The description of the bistable display material of the invention has been completed. Even if the electrical field is removed, the system remains in a clear state.

Figure 2:
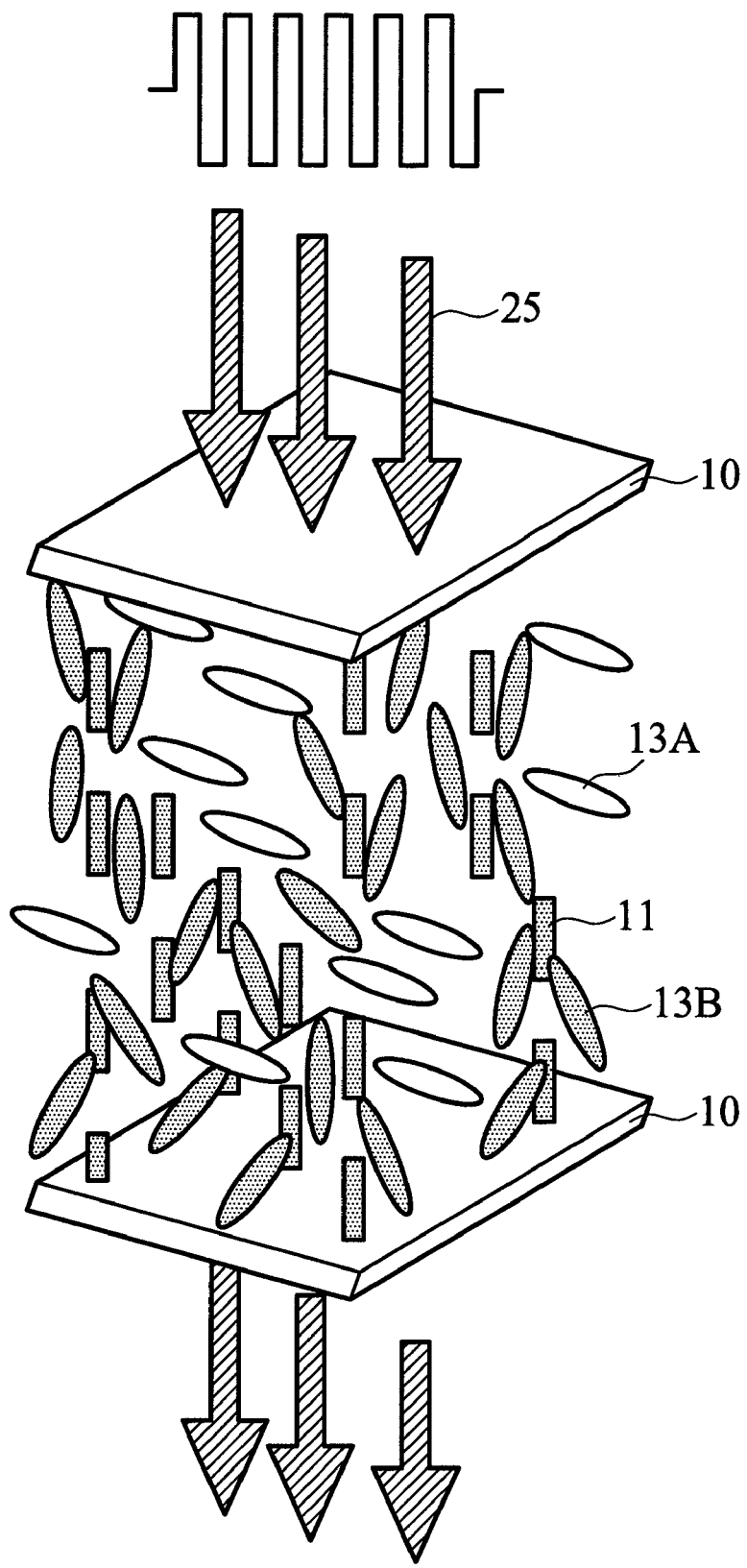
FIG. 2 is a schematic view showing the bistable display device in a scattering state in the invention.

As shown in FIG. 2, the system in a clear state is applied an electrical field 25, such that a part of the DFLCs 13A rotate to align in horizontal with the electrical field 25 direction. In one embodiment, the electrical field 25 has a high frequency of 1 kHz to 120 kHz. The frame structure constituted by hydrogen bonding in a clear state is broken by the realigned DFLCs 13A, and then form a new frame structure (not shown) corresponding to the realignment direction (horizontal with the electrical field 25 direction) of the DFLCs 13A. On the other hand, other parts of the DFLCs 13B are anchored by surrounding nano chains 11, such that the alignment direction of the DFLCs 13B cannot be totally horizontal with the electrical field 25 direction. As such, the system is in a scattering state of polydomain regions. Even if the electrical field 25 is removed, the anchoring effect of the nano chains and the new frame structure (not shown) will still stabilizes the described scattering state.

Because the nano chains are formed in a clear state, the system will transfer to a clean state when applied a low frequency electrical field. Even if the low frequency electrical is then removed, the clear state will remain.

By repeating the conversion between the high and low frequency electrical fields, the bistable display material is transferred to scattering/clean states, respectively. As described, the stable clean/scattering states remain even if the electrical field is removed.

EXAMPLES

Example 1

Different weight ratio of the DFLCs (MLC-2048, commercially available from Merck), the incurable nanoparticles (Aerosil R812, commercially available from Degussa), and the curable nanoparticles (Aerosil R711, commercially available from Degussa), were weighted as shown in Table 1, all were used without any further purification. The composites were dissolved in acetone and sonicated for about 1.0 h (Sonicator, commercially available from MISONIX) in order to achieve good dispersion. Then, acetone was evaporated off slowly for about 24 h above 40° C. before the samples were placed in a vacuum system for 24 h at 50° C. The well dispersed mixtures with photo initiator (1369, commercially available from Ciba) were melted and placed between two ITO glasses to be fabricated as a cell without any alignment treatment. PET films of 6 μm thickness were used as cell spacers.

The liquid crystal cell was applied a low frequency electrical field of 70V and 100 Hz, such that the cell was switched from a foggy appearance (scattering state) to a transparent appearance (clear state) and remained in the clear state after removal of the electrical field. For the description of the on-state memory effect, some parameters should be introduced: the initiating transparency ($T_i$, milky state), the transparency under saturation voltage ($T_s$, the most clear state), and the transparency after removal of the field ($T_1$), respectively. The memory effect of the liquid crystal cell before exposed a light can be calculated by the formulae as below:

$$M_{on} = (T_1 - T_i)/(T_s - T_i) * 100\%$$

Subsequently, the liquid crystal cell was applied a high frequency electrical field of 60V and 40 kHz, such that the liquid crystal cell was transferred from a transparent appearance (clear state) to a foggy appearance (scattering state) and remained in the scattering state after removal of the electrical field. For the description of the off-state memory effect, some parameters should also be introduced: the transparency under saturation voltage ($T_0$ for the most scattering state) and the transparency after removal of the field ($T_2$), respectively. The memory effect of the liquid crystal cell before exposed a light can be calculated by the formulae as below:

$$M_{off} = (T_2 - T_1)/(T_0 - T_1) * 100\%$$

Thereafter, the liquid crystal cell under the low frequency electrical field was exposed to an UV light (EA-180, commercially available from Spectroline) of 1300 μW/cm² for 20 seconds. After exposing and removing the field, it is found the cell remained at clear state, and also can be switched to scattering state.

The Electrooptical data of the exposed cell were measured to calculate memory effect for comparison., the results are shown as Table I.

$$M_{on} = (T_1 - T_i)/(T_s - T_i) * 100\%$$

$$M_{off} = (T_2 - T_1)/(T_0 - T_1) * 100\%$$

TABLE 1

| Composition | Serial No. | | | |
|---|---|---|---|---|
| | 1 | 2 | 3 | 4 |
| MLC-2048 | 94.3 | 93.4 | 94.8 | 94.3 |
| Total nanoparticles weight | 5.7 | 6.6 | 5.2 | 5.7 |
| R812 | 5.1 | 5.3 | 2 | 2.85 |
| R711 | 0.6 | 1.3 | 3.2 | 2.85 |
| R711 % | 10.5 | 20 | 61.5 | 50 |
| Total weight | 100 | 100 | 100 | 100 |

| Memory effect | Exposure | | | | | | | |
|---|---|---|---|---|---|---|---|---|
| | Before | After | Before | After | Before | After | Before | After |
| $M_{on}$ (%) | 84.8 | 92.9 | 72.4 | 99.3 | 89.2 | 94.1 | 93.4 | 97.7 |
| $M_{on}$ (%) | 88.2 | 90.7 | 92.6 | 93.9 | 85.1 | 84.5 | 84.9 | 92.4 |

| Composition | Serial No. | | | |
|---|---|---|---|---|
| | 5 | 6 | 7 | 8 |
| MLC-2048 | 93.4 | 94.6 | 98 | 9 |
| Total nanoparticles weight | 6.6 | 5.4 | 2 | 3 |
| R812 | 3.96 | 1.9 | 1.2 | 1.8 |
| R711 | 2.64 | 3.5 | 0.8 | 1.2 |
| R711 % | 40 | 65 | 40 | 40 |
| Total weight | 100 | 100 | 100 | 100 |

TABLE 1-continued

|  | Exposure | | | | | | | |
| --- | --- | --- | --- | --- | --- | --- | --- | --- |
| Memory effect | Before | After | Before | After | Before | After | Before | After |
| $M_{on}$ (%) | 77.5 | 95 | 83.9 | 97.3 | 95.2 | 97.8 | 96.9 | 98.3 |
| $M_{on}$ (%) | 81.9 | 94.9 | 61 | 44.6 | 43.3 | 88.1 | 49 | 88.2 |

Note:
R711 % means the weight ratio (%) of R711 in total weight of the curable and incurable nanoparticles; "Before" means the liquid crystal cell before being exposed a light, and "After" means the liquid crystal cell after being exposed a light; the photo initiator I369 and the curable R711 have a weight ratio of 1:100.

As shown in Table 1, the total weight of nanoparticles preferably are about 2% to 7% of the bistable display material, where the curable nanoparticles preferably occupies 10 wt % to 60 wt % of the total weight of the total nanoparticles, such that the bistable display device will have better memory effect.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adopting a bistable display medium, comprising:
    evenly mixing DFLCs, incurable nanoparticles, curable nanoparticles, and a photo initiator to form a mixture;
    applying an low frequency field to the mixture, wherein the voltage is large enough to let DFLCs vertically stand; and
    exposing with UV light, and the curable nanoparticles are cured to form some nano chains,
    wherein the curable nanoparticles and the incurable nanoparticles have a weight ratio of about 10/90 to 60/40, and the DFLCs and the combination of the curable nanoparticles and the incurable nanoparticles have a weight ratio of about 98/2 to 93/7, and
    the curable nanoparticles and the photo initiator have a weight ratio of about 99.5/0.5 to 95/5.

2. The method as claimed in claim 1, wherein the incurable nanoparticles have a diameter of 7 nm to 50 nm, and the incurable nanoparticles comprise titanium oxide, silicon oxide, aluminum oxide, iron oxide, or combinations thereof.

3. The method as claimed in claim 1, wherein the curable nanoparticles have a diameter of 7 nm to 50 nm, and the core of the curable nanoparticles comprises titanium oxide, silicon oxide, aluminum oxide, iron oxide, or combinations thereof, and the surface of the curable nanoparticles has an organic segment comprising a carbon-carbon double bond.

4. A bistable display material, comprising:
    98 to 93 parts by weight of DFLCs; and
    2 to 7 parts by weight of nano composition,
    wherein the nano composition is composed of 10 to 60 parts by weight of a nano chain and 90 to 40 parts by weight of incurable nanoparticles.

5. The bistable display material as claimed in claim 4, wherein the incurable nanoparticles have a diameter of 7 nm to 50 nm, and the incurable nanoparticles comprise titanium oxide, silicon oxide, aluminum oxide, iron oxide, or combinations thereof.

6. The bistable display material as claimed in claim 4, wherein the nano chain is cured of curable nanoparticles and a photo initiator, and the curable nanoparticles and the photo initiator have a weight ratio of about 99.5/0.5 to 95/5.

7. The bistable display material as claimed in claim 6, wherein the curable nanoparticles have a core-shell structure having a diameter of 7 nm to 50 nm, the core comprises titanium oxide, silicon oxide, aluminum oxide, iron oxide, or combinations thereof, and the surface has an organic segment comprising a carbon-carbon double bond.

8. A bistable display device, comprising:
    a liquid crystal layer disposed between two substrates;
    wherein the liquid crystal layer comprises the bistable display material as claimed in claim 4.

9. The bistable display device as claimed in claim 8, wherein the substrates comprise glass, quartz, plastic, rubber, polyester, or polycarbonate.

* * * * *